Sept. 30, 1969  P. C. FELIX ET AL  3,469,718

SPREADER FOR GRAIN BINS

Filed Feb. 1, 1968

INVENTORS
PAUL C. FELIX
ALLEN A. JOHNSON

BY Robillard and Bernac
ATTORNEYS

United States Patent Office
3,469,718
Patented Sept. 30, 1969

3,469,718
SPREADER FOR GRAIN BINS
Paul C. Felix and Allen A. Johnson, Taylorville, Ill., assignors to Grove Manufacturing Company, Shady Grove, Pa., a corporation of Pennsylvania
Filed Feb. 1, 1968, Ser. No. 702,370
Int. Cl. B65g 65/30; A01c 17/00
U.S. Cl. 214—17         8 Claims

ABSTRACT OF THE DISCLOSURE

A material spreading apparatus of a type in which a funnel directs grain against a rotating disc which propels the grain against the interior surface of a bell-shaped shroud wherein the shroud deflects the grain in a wide distribution pattern to insure that a bin or granary with which the apparatus will be used is evenly and uniformly filled.

---

This invention relates generally to a scatter apparatus for depositing granular material uniformly within a top-filled granary or storage bin. Such apparatus is the subject matter of other patents but heretofore the spreading pattern has not been so efficiently accomplished as in the apparatus described herein. The apparatus of this invention as well as those of the prior art have as one of their principle purposes, the elimination of manual labor performed by personnel within the bin.

A principal objective of this invention is to provide a bell-shaped shroud above a spinning disc wherein the curvilinear surface of the shroud will deflect the grain or other granular material into a wide pattern throughout the bottom of the bin.

Another objective of the invention is to provide a grain distributor of the type described wherein the vertical height of the shroud is adjustable with respect to the spinning disc to thereby adjust the pattern of distribution.

A further objective of the invention is to provide a prespin means for the grain as it approaches the spreading disc. The prespin means takes the form of a plurality of circumferentially spaced plates forming a helical path for the grain as it is fed to the bin from an auger, conveyor or similar device.

A still further objective of the invention is to provide a regulator plate above the funnel whereby the regulation of the flow towards the spinner disc is controlled by the extent of the orifices in the plate.

A still further objective of this invention is to provide the above-mentioned plate with a conical boss in the center thereof whereby the orifices direct the falling grain against said helical plates.

A further objective of this invention is to provide removable blades of various design and capability whereby the spinning disc is adaptable for granular materials of varying characteristics.

Another important objective of the invention is to provide support means for a drive motor directly below the spinning disc. This arrangement eliminates the requirements of pulleys, belts, chains, and other power transfers which have a tendency to become clogged and inoperable when working in dusty environments.

Figure 1:
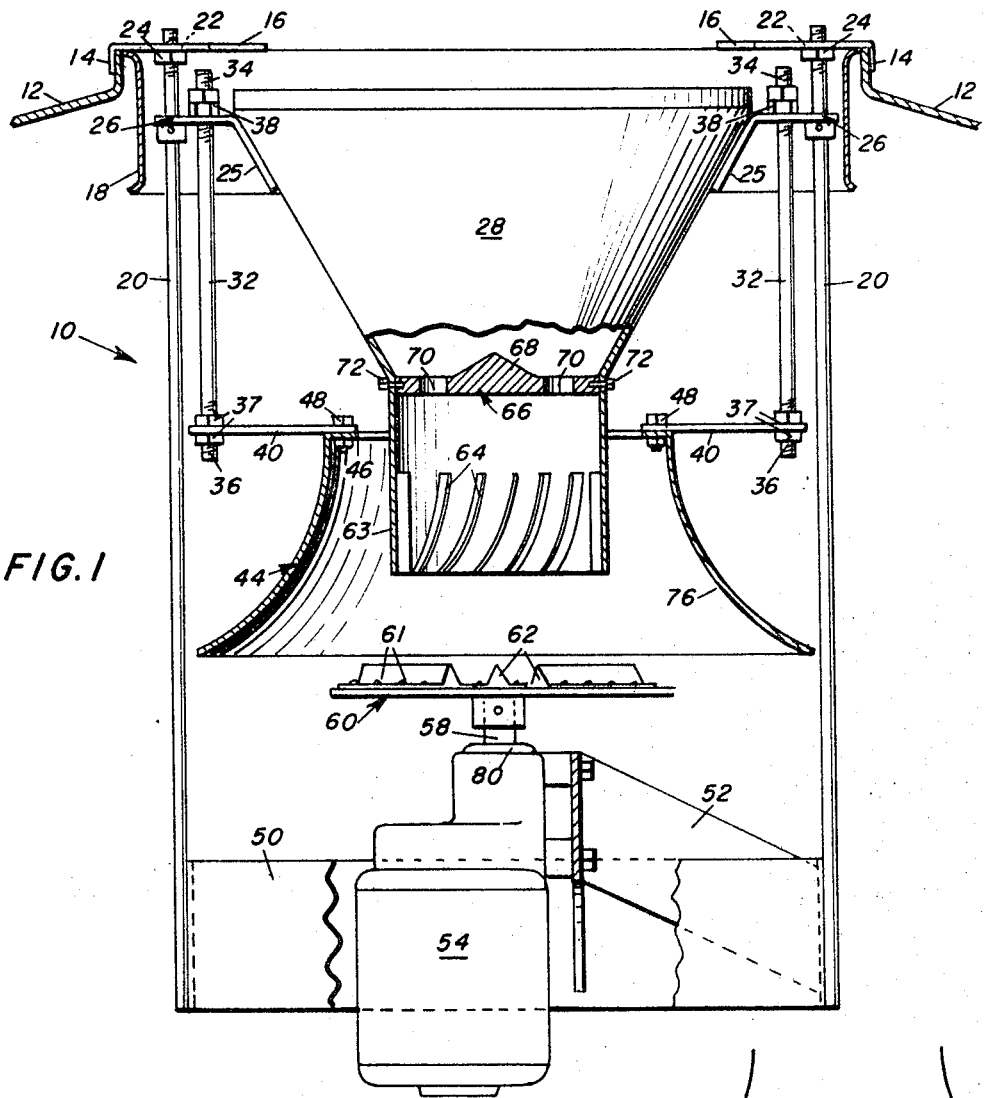
Figure 2:
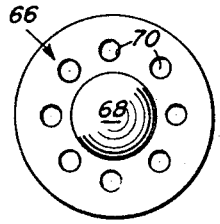
Figure 3:
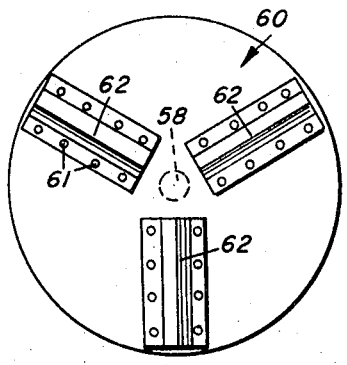
Figure 4:
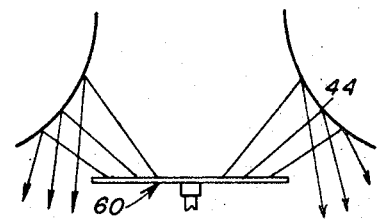

These and other objects of the invention will become more apparent to those skilled in the art by reference to the following detailed description when viewed in light of the accompanying drawings, wherein:

FIGURE 1 is an elevation view of the apparatus of this invention partly in section;
FIGURE 2 is a plan view of a regulator plate;
FIGURE 3 is a plan view of a distributor disc; and
FIGURE 4 is a diagrammatic view showing grain deflection.

Referring now to the drawings wherein like numerals indicate like parts, the numeral 10 indicates the apparatus of this invention. The apparatus is suspended at the top of and centrally of a conventional grain bin 12 by way of peripherally disposed suspension hooks 14. The hooks 14 have inwardly extending extensions 16 which ride over the top of an upper annular ring 18. By adjusting the hooks inwardly and outwardly with respect to the ring 18, the apparatus is made to accommodate bins having different size upper openings.

Depending downwardly from each of the extensions 16 are a plurality of support rods 20 which respectively extend through slots 22 in the flanges 16. The upper ends of the rods are securely affixed to their flanges 16 by the tightening of nuts 24. The supporting rods 20 support several elements along their vertical length. First, a plurality of brackets 26 are supported immediately below the hooks and are formed with inwardly and downwardly extending legs 25 which support and engage a funnel hopper 28. The brackets 26 further include horizontal legs 30 which receive suspension rods 32 therethrough. The suspension rods are threaded at both ends as depicted by the numerals 34 and 36. About each of the upper threaded portions 34 is a pair of set and lock nuts 38 and about the lowered threaded portions 36 is a pair of nuts 37 which in turn secure a pair of inwardly extending arms 40. The height of arms 40 with respect to the rods 32 can be changed by merely adjusting the nut members.

A bell-shaped shroud member 44 is suspended from the arms 40. At its uppermost edge the shroud is terminated by an inwardly directed flange 46. The flange 46 is secured to the outer ends of arms 40 by way of nut and bolt members 48. The shroud encloses the lower end 49 of the funnel hopper 28.

Welded to the lower ends of support rods 20 is an annular bottom ring 50. Extending inwardly from the bottom ring are one or more flanges 52 which support a motor 54 immediately below the hopper 28. Affixed to the upper end of the motor output shaft 58 is a distributor disc 60. As best seen in FIGURE 4, the distributor disc 60 has a plurality of blades 62 mounted to its upper surface. The blades are affixed to the disc by way of bolts 61 and therefore can be removed and replaced when desired.

The lower end of hopper 28 is terminated by a skirt member 63 having interior helix-like direction blades 64. Removably disposed above the skirt 63 is a regulator plate 66. A conical boss 68 extends upwardly from the center of the regulator plate. Disposed about the boss are a plurality of orifices 70. The plate is affixed to the lower end of the funnel portion by way of bolt members 72.

In operation, grain is fed into funnel 28 in the conventional manner. As the grain falls to the lower end of the funnel, it is guided away from the center by boss 68 and is directed through orifices 70. A good portion of the grain impinges on helical vanes 64 and thus receives a prespin movement as it falls to rotating disc 60. As disc 60 rotates, the blades 62 (due to centrifugal force) propel the granular substance against the curvilinear surface 76 of the shroud 44. As seen in the somewhat exaggerated diagrammatic view of FIGURE 5, the grain will strike the curvilinear surface as shown by the arrows and due to the inner curvilinear surface scatters the grain as shown. The efficiency of broadcast due to the curvilinear surface, results in a uniform dropping of the grains to the bottom of the bin.

Grains having different characteristics, that is different weights and sizes, will have different scatter characteristics. In order to obtain the most efficient distribution this apparatus provides for several adjustments. By changing the height of arms 40, the shroud and its curvilinear surface is moved vertically with respect to the rotating disc. In this manner, the most efficient area of surface 76 is selected. As known to those working in the art, the configuration, height and inclination of blades 62 will effect the propelling of the grain. The blades 62 are removable and changeable with blades of desired characteristics. Another means of control is by way of a regulator plate 66. In many instances it is desired to control the rate of feed which is dropped to the spreaded disc. Such control can be obtained by substituting various plates having differing patterns and sizes of orifices 70. The boss 68, of course, causes the grain to be guided towards these peripherally arranged orifices. The grain falling through the orifices will thus have a tendency to strike the helical vanes 74 in order to produce a pre-spin which reduces the load on motor 54.

It should also be noted that motor 54 is disposed below the funnel-hopper and the output shaft 58 is disposed immediately beneath the center of the distributor disc 60. In this manner, no pulleys, chains, or auxiliary power trains are necessary which cause fouling or other difficulties because of dust particles which are inherently present in environments of this type. The interior of the motor can be sealed efficiently at bushing 80.

In a general manner, while there has been disclosed effective and efficient embodiments of the invention, it should be well understood that the invention is not limited to such embodiments, as there might be changes made in the arrangement, disposition, and form of the parts without departing from the principle of the present invention as comprehended within the scope of the accompanying claims.

We claim:
1. A grain distributor of a type for use with grain bins having a top opening of a diameter appreciably less than the diameter of the bin comprising a funnel defining a relatively wide opening at its upper end and a relatively narrow opening at its lower end, first means for supporting said funnel from the periphery of said top opening to the interior of said bin, second means positioning a bell-shaped shroud having a convex inner surface throughout its length about said lower end of said funnel such that said convex inner surface surrounds said lower end, a vertical spinner shaft located vertically below said lower end, a motor to rotate said shaft, a horizontal spreader disc affixed to the upper end of said shaft and rotatable therewith, and spreader blades on the upper surface of said disc for propelling grain falling from said lower end toward the curvilinear surface whereby the grain deflected from said curvilinear surface is widely distributed throughout said bin.

2. The distributor recited in claim 1 wherein said second means includes rods and further means to adjust the vertical height of said shroud with respect to said lower end.

3. The grain distributor recited in claim 1 wherein pre-spin means terminate the interior of said lower end.

4. The grain distributor of claim 3 wherein said pre-spin means is comprised of a plurality of plates forming a helical pattern along the interior surface of said funnel.

5. The grain distributor of claim 3 wherein a horizontal regulator plate is supported by said funnel above said lower end, a boss extending upwardly from the center of said plate and said plate having a plurality of orifices about said boss.

6. The distributor of claim 1 wherein means removably mount said blades on said disc.

7. The distributor of claim 1 wherein a regulator plate is removably mounted in said funnel.

8. The distributor of claim 1 wherein the output shaft of said motor means rotates about a vertical axis and said first means supports said motor.

References Cited
UNITED STATES PATENTS

| | | | |
|---|---|---|---|
| 2,955,828 | 10/1960 | Kinsella | 214—17 X |
| 3,232,458 | 2/1966 | Freeman | 214—17 |
| 3,305,108 | 2/1967 | Edming | 214—17 |
| 3,374,356 | 3/1968 | Bazilli et al. | 214—17 |

FOREIGN PATENTS 482,702   4/1938   Great Britain.

ROBERT G. SHERIDAN, Primary Examiner

U.S. Cl. X.R.
239—666, 687